(12) United States Patent
Belcea

(10) Patent No.: US 7,106,703 B1
(45) Date of Patent: Sep. 12, 2006

(54) SYSTEM AND METHOD FOR CONTROLLING PIPELINE DELAYS BY ADJUSTING THE POWER LEVELS AT WHICH NODES IN AN AD-HOC NETWORK TRANSMIT DATA PACKETS

(75) Inventor: John M. Belcea, West Melbourne, FL (US)

(73) Assignee: Meshnetworks, Inc., Maitland, FL (US)

( * ) Notice: Subject to any disclaimer, the term of this patent is extended or adjusted under 35 U.S.C. 154(b) by 961 days.

(21) Appl. No.: 10/155,017

(22) Filed: May 28, 2002

(51) Int. Cl.
  *H04B 7/00* (2006.01)
(52) U.S. Cl. ...................... 370/310; 455/13.4
(58) Field of Classification Search ................ 370/310, 370/332, 349, 400, 338, 331, 329, 351; 455/432.1, 455/13.4, 522
  See application file for complete search history.

(56) References Cited

U.S. PATENT DOCUMENTS

| | | | |
|---|---|---|---|
| 4,494,192 A | 1/1985 | Lew et al. | 364/200 |
| 4,617,656 A | 10/1986 | Kobayashi et al. | 370/74 |
| 4,736,371 A | 4/1988 | Tejima et al. | 370/95 |
| 4,742,357 A | 5/1988 | Rackley | 342/457 |
| 4,747,130 A | 5/1988 | Ho | 379/269 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,392,450 A | 2/1995 | Nossen | 455/12.1 |
| 5,412,654 A | 5/1995 | Perkins | 370/94.1 |
| 5,424,747 A | 6/1995 | Chazelas | 342/70 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |

(Continued)

FOREIGN PATENT DOCUMENTS

CA  2132180  3/1996

(Continued)

OTHER PUBLICATIONS

Wong et al., "Soft Handoffs in CDMA Moble Systems", Dec. 1997, IEEE Personal Communications.

(Continued)

*Primary Examiner*—Brenda Pham
(74) *Attorney, Agent, or Firm*—Randi L. Karpinia; Joseph J. Buczynski

(57) ABSTRACT

A system and method for calculating an optimum transmission power level in an ad-hoc network communication path having a maximum number of transmission hops. The system and method calculates an optimum transmission power level for transmission routes having a maximum number of hops between nodes and transmits the communication using the calculated power level such that a transmission path is achieved that results in a maximum pipeline delay during transmission that does not exceed allowable levels for the service class provided.

17 Claims, 4 Drawing Sheets

U.S. PATENT DOCUMENTS

| | | | |
|---|---|---|---|
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,735,448 B1 * | 5/2004 | Krishnamurthy et al. | 455/522 |
| 6,748,233 B1 * | 6/2004 | Arnold et al. | 455/522 |
| 6,970,714 B1 * | 11/2005 | D'Souza et al. | 455/522 |
| 2001/0053699 A1 | 12/2001 | McCrady et al. | 455/513 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0034932 | 6/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Sef-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Qualtiy-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR CONTROLLING PIPELINE DELAYS BY ADJUSTING THE POWER LEVELS AT WHICH NODES IN AN AD-HOC NETWORK TRANSMIT DATA PACKETS

BACKGROUND OF THE INVENTION

1. Field of the Invention

The present invention relates to a system and method for calculating an optimum allowable transmission power level in an ad-hoc network communication path. More particularly, the present invention relates to a system and method for calculating an optimum transmission power level for transmission routes having a variable number of hops between nodes resulting in a maximum pipeline delay during transmission that does not exceed allowable levels for the service class provided.

2. Description of the Related Art

Ad-hoc networks have become a rapidly growing application in wireless mobile communications. An ad-hoc network is comprised of a number of mobile devices which are capable of direct and indirect communication with one another, such that each mobile device may be used as a router for data packet transmissions from other mobile devices. Transmitted data packets "hop" from mobile device to mobile device, creating a transmission path, until reaching a final destination. However, transmission paths between mobile devices are often subject to change as devices move, therefore ad-hoc network communication must be able to adapt and establish paths with optimum performance.

Typically, moving devices within an ad-hoc network result in variations in transmission path distance and associated transmission power levels. Although intelligent access points (IAPs) and stationary routers may theoretically include unlimited power supplies to provide transmission power, mobile devices are typically powered from rechargeable batteries. Therefore, a significant operation parameter in ad-hoc networks is the selection of transmission paths between devices requiring the lowest power consumption levels. Given no other factors, a transmission path comprised of short hops between multiple, closely spaced mobile devices will typically require less transmission power than a path comprised of fewer hops between widely spaced devices. Therefore a path requiring less transmission power is often possible where a large number of dispersed mobile devices within an ad-hoc network exist. Longer, direct transmission paths with fewer hops, as in the case occurring when an ad-hoc network has fewer dispersed mobile devices, will typically require greater transmission power levels. Therefore, a transmission path comprised of short hops between close mobile devices when possible, is the preferred communication route to conserve the limited power resources of mobile devices. However, a second factor beyond transmission path power consumption must be considered in ad-hoc communications networks.

As data packets are transmitted between multiple mobile devices, a cumulative transmission delay is created, which is not present in more direct transmission routes. Delays resulting from excessive hopping may be unsuitable for many service classes. For example, the "pipeline delays" resulting from excessive hopping is unsuitable for telephone communication, however certain data transfers may tolerate these larger delays. When the maximum accepted pipeline delay is small, the number of hops along the route between correspondents or between one correspondent and its IAP must be smaller than the number of hops along routes supporting unidirectional data transfer. As discussed above, transmission routes having a large number of hops require less transmission power, while routes having fewer hops, such as routes required for interactive voice data, use higher transmission powers. The resulting selected route in each case therefore, must satisfy pipeline delay requirements as well as address power consumption concerns for battery powered mobile devices.

Presently, routing schemes have included a number of methods. As described in U.S. Pat. No. 5,987,011 to Toh, which is incorporated herein by reference, conventional routing schemes are typically based on either broadcast or point-to-point routing. As discussed in Toh, numerous routing schemes have been implemented including cluster-based routing, destination sequence distance-vector routing and dynamic source routing. Each technique uses some combination of point-to-point and broadcast routing using the connection-oriented packet forwarding approach. Although each routing scheme provides a transmission path, no concern is given to the pipeline delay restrictions for differing service classes or the restricted power supplies of mobile devices. Excessive pipeline delays are often unacceptable for many service classes, however, transmission paths with lower delays typically require greater transmission power levels.

Accordingly, a need exists for a system and method in which maximum pipeline delays are determined for service classes in an ad-hoc network, and an optimum transmission power level calculated for a selected transmission path satisfying these delay requirements.

SUMMARY OF THE INVENTION

An object of the present invention is to provide a system and method for determining allowable pipeline delays for service classes within an ad-hoc network.

Another object of the present invention is to provide a system and method for determining and selecting a transmission path satisfying these delay requirements.

Still another object of the present invention is to provide a system and method for calculating and adjusting transmission power levels for a selected transmission path which satisfies allowable pipeline delays.

These and other objects are substantially achieved by providing a system and method for calculating an optimum transmission power level for transmission routes having a variable number of hops. The transmission route is selected to produce a maximum pipeline delay during transmission that does not exceed allowable delay levels for the service class provided and the optimum transmission power level for the selected route.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
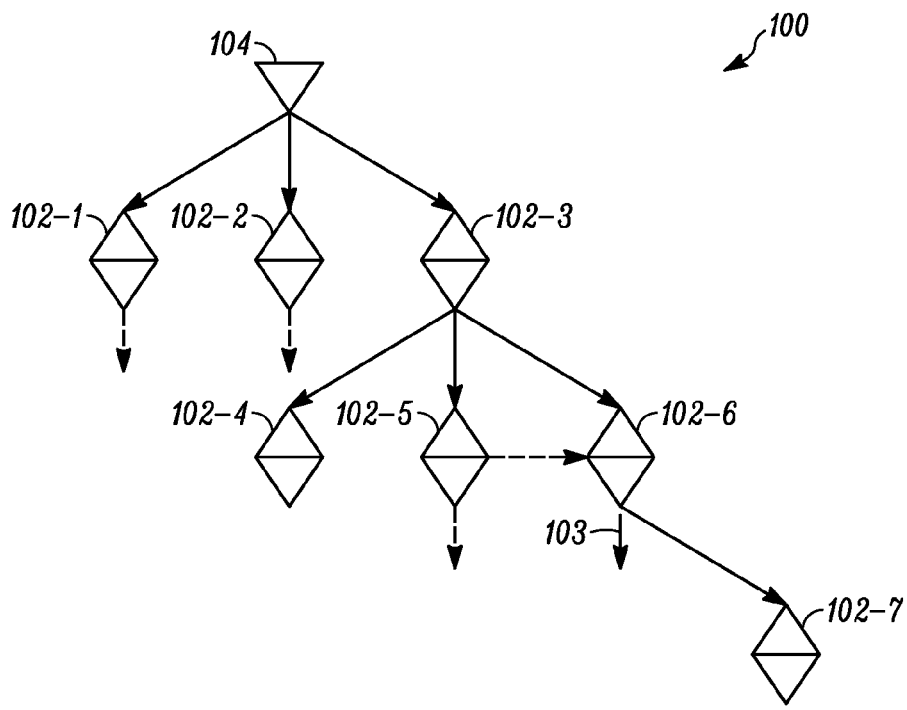
FIG. 1 is a conceptual block diagram illustrating an example of the connections within an ad-hoc network in a first position employing a system and method according to an embodiment of the present invention.

In the ad-hoc network shown in FIG. 1, each mobile terminal, or "mobile node" 102-1, 102-2 . . . 102-7, is connected to an intelligent access point (IAP) 104 or to its correspondent, either directly or through other mobile nodes 102. In more widely dispersed networks, stationary routers may also be used to provide connections between mobile node and mobile node, or between mobile node and IAP. In FIG. 1, the mobile nodes 102 are capable of communicating directly with each other, or via one or more other mobile nodes, operating as routers, for data packets being sent between nodes, as described in U.S. Pat. No. 5,943,322 to Mayor, which is incorporated herein by reference.

Figure 2:
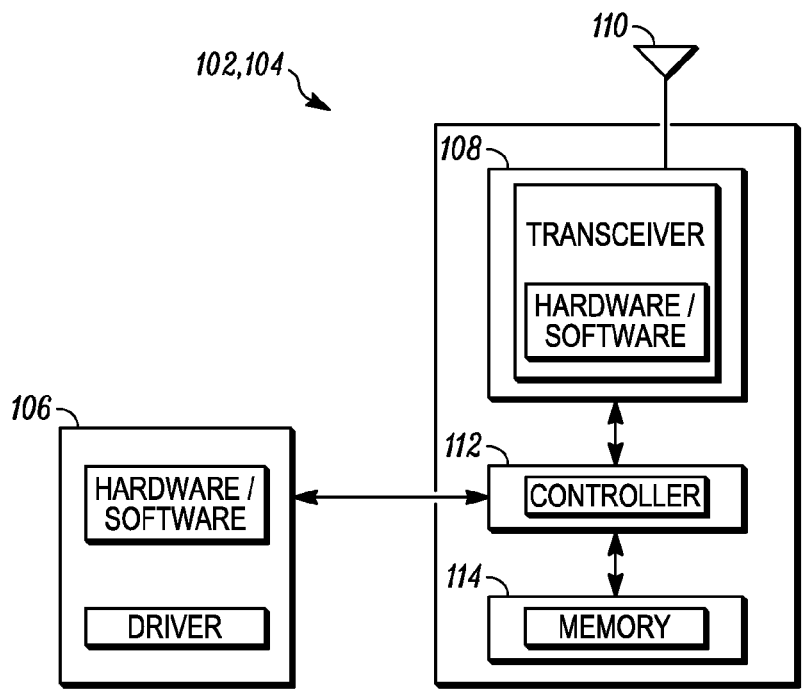
FIG. 2 is a block diagram of an example of a wireless node as shown in FIG. 1.

As shown in FIG. 2, each mobile node 102 of FIG. 1 can include a subscriber device host 106 which can be, for example, a notebook computer terminal, mobile telephone unit, mobile data unit, or any other suitable device. Each node 102 further includes a transceiver 108, including a transmitter and a receiver, which collectively can be referred to as a modem, coupled to an antenna 110, capable of transmitting and receiving signals, such as packetized data signals, under the control of a controller 112. In particular, for purposes described below, the controller 112 can also control the power level at which the transceiver 108 transmits the data packets. The packetized data signals can include, for example, voice, data or multimedia information.

Each node 102 further includes a memory 114, including a read only memory (ROM) for storing information pertaining to the operation of the node, and a random access memory (RAM) for storing information such as routing table information and the like, in accordance with data packets transmitted, received and routed by the transceiver 108. Further details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, and in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, the entire content of both applications being incorporated herein by reference.

In addition, the controller 112 also includes the appropriate hardware and software to perform Internet Protocol (IP), Address Resolution Protocol (ARP), admission control (AC), traffic control (TC), ad-hoc routing (AHR), logic link control (LLC) and media access control (MAC) the purposes of which can be readily appreciated by one skilled in the art. The controller 112 further includes the appropriate hardware and software for IAP association (IA), UDP, simple network management protocol (SNMP), data link (DL) protocol and dynamic host configuration protocol (DHCP) relaying.

As shown in FIG. 1, the intelligent access point (IAP) 104 in this example is a fixed node that provides connectivity to land networks and provides the class of service the mobile nodes 102 may require. Service classes may include internet access, real time voice data exchange, file data transfer, reception or transmission of multimedia broadcast, short message services, and reception or transmission of local emergency broadcasting. In low-density areas where the number of mobile nodes 102 is too small for connecting in a network, stationary routers may be used (described, but not shown in FIG. 1). Also, certain IAPs 104 could be configured to be mobile if necessary or appropriate. However, the embodiments of the present invention are described herein with regard to fixed IAPs. The fixed IAP 104 and stationary routers (if required) are powered from theoretically unlimited power supplies, while mobile nodes 102 are powered from rechargeable batteries. Due to the limited time a mobile node can be powered from batteries, the routing methods within the ad-hoc network must assure full network connectivity using as little transmission power as possible.

When a mobile node 102 is required to provide a service, it searches for the neighbor node that provides the best connection to an IAP, or to a targeted correspondent. In general, there is more than one neighbor node able to support the connection, but only one is selected. If the selected neighbor node is not the destination of the connection, the neighbor node will repeat the process, selecting another neighbor node. This "hopping" creates a transmission route from the source of the connection to the destination, or to the IAP, if the destination is not located in the same cluster of mobile nodes.

Each transmission route has an associated power transmission level, which may vary according to the number of hops along the route. Ad-hoc network "connectivity" is a concept that is not associated to service classes, but relates to network structures using the smallest amount of energy for exchanging data. Various degrees of connection may exist between nodes of a network. A "fully" connected network allows each node to communicate with all neighbor nodes using as little power as possible. Using this connectivity, the route requiring minimum transmission energy levels can be built between IAP 104 and any mobile node 102. However, as the number of hops along the route are reduced in order to improve pipeline delays, remaining hops are at greater distances and data exchange energy levels increase.

The transfer of data between terminals is executed along routes, and is defined by criteria which describe the path connecting the source to the destination, the type of service provided and, indirectly, the instantiation of the client application. Between mobile nodes 102 and IAP 104 in FIG. 1, there may be many active routes, each supporting different applications, or many instances of the same application, and each route may have specific requirements regarding the acceptable pipeline delay depending upon the class of the requested service.

In the embodiment of the present invention shown in FIG. 1, application data is transferred between a source mobile node 102-7 and the IAP 104 using a sequence of many mobile nodes present in the network. The connectivity process creates connectivity paths between the mobile nodes 102 and the IAP 104 where the connectivity path makes use of the smallest possible energy, but also has the largest number of "hops" between mobile devices, and the largest pipeline delay.

Figure 3:
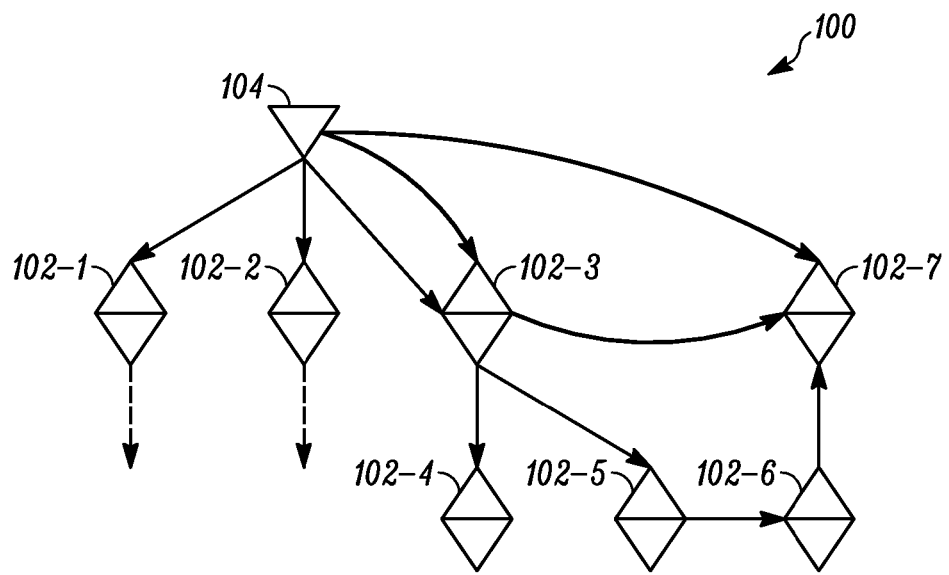
FIG. 3 is a conceptual block diagram illustrating an example of the connections within the ad-hoc network of FIG. 1 in a second position employing a system and method according to an embodiment of the present invention.
Figure 4:
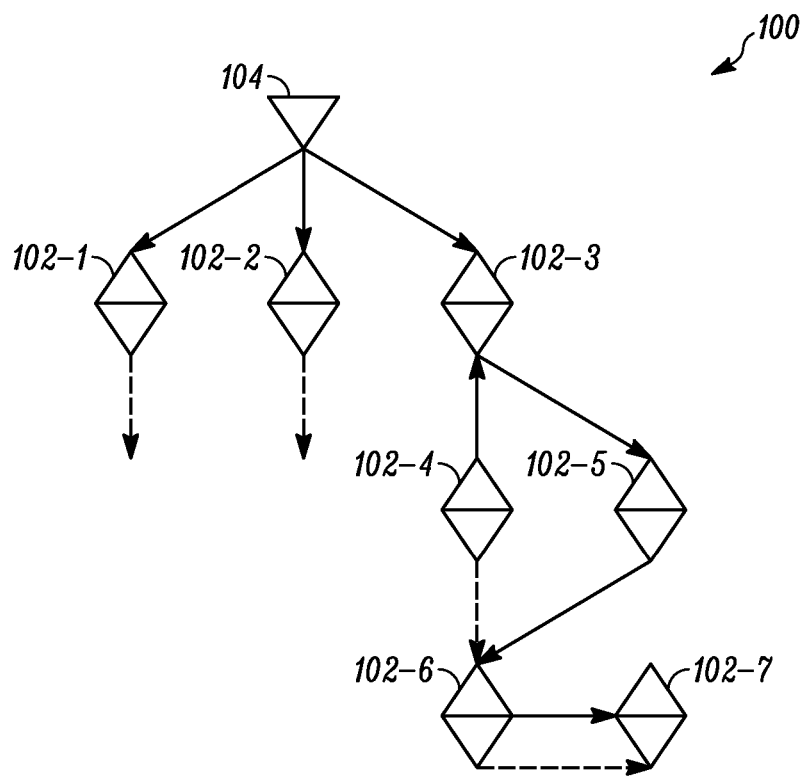
FIG. 4 is a conceptual block diagram illustrating an example of the connections within the ad-hoc network of FIG. 1 in a third position employing a system and method according to an embodiment of the present invention.

As shown in the example presented in FIG. 1, the mobile nodes of an ad-hoc network may originally assume any number of random positions. In FIG. 1, nodes 102-1 and 102-2 are located closer to IAP 104 than nodes 102-6 and 102-7. However, mobile nodes change position in time, as shown in FIGS. 3 and 4. The change in mobile node positions results in changing transmission routes within the ad-hoc network and corresponding transmission power level requirements. As nodes move further apart, transmission power levels must be increased to maintain contact between separating nodes. However, each increase of the transmission power level must be considered only after reviewing the current ad-hoc neighborhood requirements as alternate routes providing the same transmission quality, while using lower energy.

FIG. 1 shows the mobile node 102-6 moving away from node 102-3 along a path 103. The evolution of the path between 102-3 and 102-6 (i.e. widening) and between 102-5 and 102-6 (i.e. narrowing), may require 102-6 to reconnect to IAP 104 through 102-5 via 102-3, as 102-5 becomes closer and requires less transmitting power than the direct connection to 102-3.

FIG. 3 shows an example of the connection paths of FIG. 1 in a second position. The network of FIG. 3 is fully connected which allows each node to communicate with all neighbor nodes. In such a network, the "connectivity" path uses node to node communication to achieve a route between nodes where transmission levels are at the lowest levels possible. In FIG. 3, a first connection, or connectivity path, between IAP 104 and node 102-7 is shown (104→102-3→102-5→102-6→102-7) which may be used to support links between nodes moving data for service class applications tolerant of very large delays, as multiple hops (4) are required. The total transmission energy used for passing data along the route however, is the smallest possible for a transmission between nodes 104 and 102-7.

Also shown in FIG. 3, the connectivity between nodes may also be used to create a second path between IAP 104 and node 102-7 using mobile node 102-3 as a router (104→102-3→102-7). The second route is shorter than the connectivity path, having only two (2) hops. The second route can be used for data exchanging applications requiring smaller delays, as fewer hops are required. In order to maintain the route as the nodes 102-3 and 102-7 move however, mobile nodes 102-3 and 102-7 have to increase the transmitting power to a level that allows both of them to communicate directly with each other.

In FIG. 3, the third, or direct route between IAP 104 and 102-7 (104→102-7) is also built on the connectivity of the network. The direct route has only one (1) hop, thus very small delays are expected, but transmissions require much more energy than any other route. When exchanging messages, IAP 104 and 102-7 have to use very high transmitting power levels for maintaining the route, levels exceeding any other route. If, for example, mobile node 102-7 is running three applications using three different classes of data, the first, second and third path may be active at the same time. In such a case, mobile node 102-7 and IAP 104 use transmitting power levels that vary from one class to another when transmitting data.

A high-energy route, such as the third path (104→102-7) in FIG. 3, implies the use of high transmission power levels for passing messages. As can be appreciated by one skilled in the art, for preventing unexpected interference, the transmitting power in data channels should be the same or lower than the transmitting power in configuration channels. If the ad-hoc network 100 of FIG. 3 intends to maintain full connectivity, all mobile nodes 012 should adjust the power in configuration channels, even if only one route has a real need for adjustment. This is explained in greater detail below. Furthermore, if network full connectivity is not intended, only the mobile nodes 102 involved in route support must increase the transmitting power, but the probability of interference is higher.

It can be also noted that the nodes 102 can use a "local route", if possible. As shown in FIG. 4, a local route is defined as connecting two mobile nodes 102 directly, without involving the IAP 104 (102-4→102-3→102-5→102-6→102-7), although both nodes 102-4 and 102-7 may be connected to other portions of the network 100 or to other networks, such as the PSTN and Internet, through the same IAP 104. This local connecting route has four (4) hops, which may result in unacceptable delays for certain classes of interactive service. Increasing the transmitting power at mobile node 102-4 and 102-6, will have the effect of changing the length of the local route. If transmitting power levels are increased at nodes 102-4 and 102-6, a new route is possible, as the higher power levels now allow 102-6 to connect directly to 102-4. In the new path of the mobile nodes 102-4 to 102-7 (102-4→102-6→102-7), the route has only two (2) hops. In this example, an increased transmitting power level is applied to nodes 102-4 and 102-7 of FIG. 4. At the increased power level, node 102-4 can now directly reach node 102-6. Therefore, in a fully connected network in which nodes adjust power to respond to nodes from which transmissions are received, node 102-6 increases it's power level to match the power level increase at node 102-4. Although the power level at node 102-7 is increased, the increase is not necessary, as node 102-6 is within range of lower power levels, and node 102-4 is beyond the range of the increased power level. Therefore, the initial increase at 102-7 is reduced as the system adjusts to maintain connectivity. As discussed in further detail below, the application of the increased transmission power levels at both ends of the route may be adjusted for "loosely" connected networks. In a loosely connected network, the adjustment is made at the originating end of the transmission route, as full network connectivity is not a goal.

The use of higher transmitting power along routes as shown in FIG. 4, allows mobile nodes to exchange data with decreased delay, but there are significant drawbacks. The use of high transmission power levels rapidly drains the limited power supplies of mobile nodes participating in route support and reduces the availability of system resources, making the reuse of frequencies difficult.

For a path between the IAP 104 and a target mobile node 102, where the path includes $N_0$ hops originally (via connectivity), an IAP transmit power $P_0$ and a maximum allowable number of hops not exceeding N, a new transmit power to be used at the IAP (or, in the case of a fully connected network, at the IAP and target node) may be calculated as P (minimum) from equation (1).

$$P = P_0 + \left[20\lambda\log_{10}\left(\frac{N_0}{N}\right)\right] \text{ dBm} \qquad (1)$$

Equation (1) provides a means to compute a new power P that will result in a route having only N hops instead of $N_0$. The parameter $\lambda$ is the "space absorption" variable, and is dependent on many factors, including the propagation media characteristics (i.e. free space, concrete walls and floors, wooden walls, metal frame structure, foliage, etc), radio energy received from various sources (i.e. lateral reflections, vertical reflections, radio noise, etc) and the current topology of the ad-hoc neighborhood. The initial value for λ can be 1.5, but it may be dynamically adjusted based on system reaction to the hop number adjustments being made.

For a fully connected neighborhood, the new power P is applied at both the IAP and the destination node. As appreciated by one skilled in the art, full network connectivity means that each node in a neighborhood can reply, in like fashion, to each direct contact received from other nodes in the neighborhood. For example in FIG. 4, if node 102-6 can hear node 102-4, node 102-6 must use the same transmission power level to reply so node 102-4 can hear it. In a fully connected neighborhood, when a node increases transmission power it reaches nodes at further distances and all nodes reached must increase transmission power levels also, in order to answer back. Therefore, as described above, an increased transmission power level at node 102-4 in FIG. 4 will result in a similar increase at node 102-6 (if reached) to maintain network connectivity. As node 102-7 already reaches node 102-6 at an initial power level (minimum required for network connectivity), the increase at node 102-7 is not required.

In an example of the embodiment of the present invention, the connection between nodes in the network are not controlled by the minimum energy, but by the pipeline delay requested for the provided service. For instance, if nodes A (i.e. the IAP), B, C, D, E and F, are located in a straight line within a network, evenly spaced with 100 m between each, the minimum connectivity energy would require each node to transmit at a power level high enough to reach adjacent nodes at 100 m. This means that every node can talk to adjacent nodes on the left and the right of it's position within the network. In this example, it is possible to transmit a data packet from any of these six nodes to any other node. If node F requires a service that cannot have more than three hops, node F will increase the power to a new level P, as determined by equation (1). The new power level now allows node F to reach node D, at 200 m. Node D will in turn, increase transmission power to reach node F, as required in a fully connected neighborhood. But in doing so, node D also reaches node B at 200 m, which is located at the same distance from node D as node F. The contact made between nodes D and B makes node B increase transmission power so it can be heard at node D at 200 m. At this point the transmission power in example network is stabilized as follows: nodes A, C and E will use transmission power levels capable of reaching 100 m, while nodes B, D and F use transmission power levels capable of reaching 200 m. As a result, in this example, the route from node A to node F, specifically the route A→B→D→F, has only three (3) hops, created from the application of a new power level P at node F.

In the same example, should the service now require no more than two hops between nodes A and F, node F must increase transmission power so it can be heard by node C at 300 m. Node C, as required in a fully connected neighborhood, also increases transmission power to reach as far as 300 m. At this increased transmission power level, node C can reach nodes A and E at 200 m as well. Therefore, nodes A and E increase transmission power to reach node C at 200 m. Elsewhere, node F can reach node D at 200 m. Therefore, node D increases transmission power to reach node F at 200 m. In doing so, node D now reaches node B, therefore node B increases transmission power to reach node D at 200 m. The resulting transmission power profile in the network of this example becomes: nodes A, B, D and E will use transmission power levels capable of reaching 200 m, while nodes C and F use transmission power levels capable of reaching 300 m. In this example, every node had to increase transmission power just because the service required fewer hops during transmission from node F to node A and the network was fully connected. As a result, in this example, the route from node A to node F, specifically the route A→C→F, has only two (2) hops, created from the application of a new power level P at node F.

In this example, the transmission power was increased only at node F. In typical applications however, the nodes are not spaced at an equal distance, therefore the new power P must be applied at both ends of the transmission route. In the last example, should the service require no more than two hops between nodes A and F, and the new power P is applied at nodes A and F, node A can now reach node D, and node F can now reach node C, both at 300 m. Nodes C and D must increase transmission powers so each can be heard by nodes A and F, respectively, at 300 m. At this increased transmission power level, node C can reach node E at 200 m. Therefore, node E increases transmission power to reach node C at 200 m. Elsewhere, node D can reach node B at 200 m. Therefore, node B increases transmission power to reach node D at 200 m. The resulting transmission power profile in the network of this example becomes: nodes A, C, D and F will use transmission power levels capable of reaching 300 m, while nodes B and E use transmission power levels capable of reaching 200 m. As with earlier examples, every node had to increase transmission power just because the service required fewer hops during transmission from node F to node A and the network was fully connected. As a result, in this example, the route from node A to node F, specifically, either route A→C→F or A→D→F, has only two (2) hops, created from the application of a new power level P at nodes A and F.

Using a much larger number of nodes from which the route is comprised, the final transmission power profile shows a variation of high and low power levels. The profile illustrates the power these nodes use for exchanging configuration messages while the route from A to F is active. When the route is disconnected, the power in the configuration channel returns to normal, where each node talks only to the neighbor nodes.

As discussed above, the method for adjusting the number of hops depends on the policy applied for network neighborhood connectivity. For fully connected neighborhoods, the power correction computed with equation (1) is applied at the IAP and the target mobile node. The increased power calculated from equation (1) applies to both ends of the transmission path and the network adjusts to maintain full network connectivity. Therefore, the initial increase of power applied at both ends of the transmission path is identical and the remaining nodes of the network react to this power increase by adjusting transmission power levels such that the full connectivity of the neighborhood is preserved. Starting from the IAP or from the destination mobile node, the next correspondent is selected close to the limit of the propagation range, that is, the farthest neighbor that can assure a reliable connection. Nodes not selected, but within the increased transmission range, respond to maintain connectivity as outlined in previous examples.

For loosely connected neighborhoods, each node of the neighborhood is not required to maintain communication with each node from which communication is received. The loosely connected neighborhood contains nodes having power levels specific to individual transmission paths containing the node. In the embodiment of the present invention shown, for a loosely connected neighborhood, the power correction determined by equation (1) is applied at either the IAP, if data travels from the IAP to the mobile node, or applied at the source mobile node, if data travels from the source mobile node to the IAP. The transmitting power is computed with equation (1) and the next neighbor is selected at the limit of the propagation range at this power.

The same equation (1) is used for computing any change of transmitting power, either an increase or decrease, from the currently active route or from minimum power connectivity. Adjusting the transmitting power is a corrective step that should be considered every time a route is "healed" from breaks caused by mobile node movements. A major route repair may require reconsidering the selection of neighbors for the entire transmission route in order to provide service at appropriate pipeline delays using appropriate transmitting power levels.

Factors such as randomly distributed mobile nodes, the presence of other radio signal sources interfering with mobile node transmissions or widely heterogeneous propagation media may prevent the embodiment of the present invention described above from achieving the expected quality after applying the correction as from equation (1). If the initial adjustment does not have the expected result, the same equation (1) is used again for improving the quality of service. Therefore, repeat applications may be required as optimum values are reached. During repeat applications, variables such as the value of $\lambda$ in equation (1) may be adjusted for improving results of further estimates of power corrections. Corrections of this parameter in increments should be acceptable, such as increasing or decreasing the value of $\lambda$ by 10%, depending on error direction.

Figure 5:
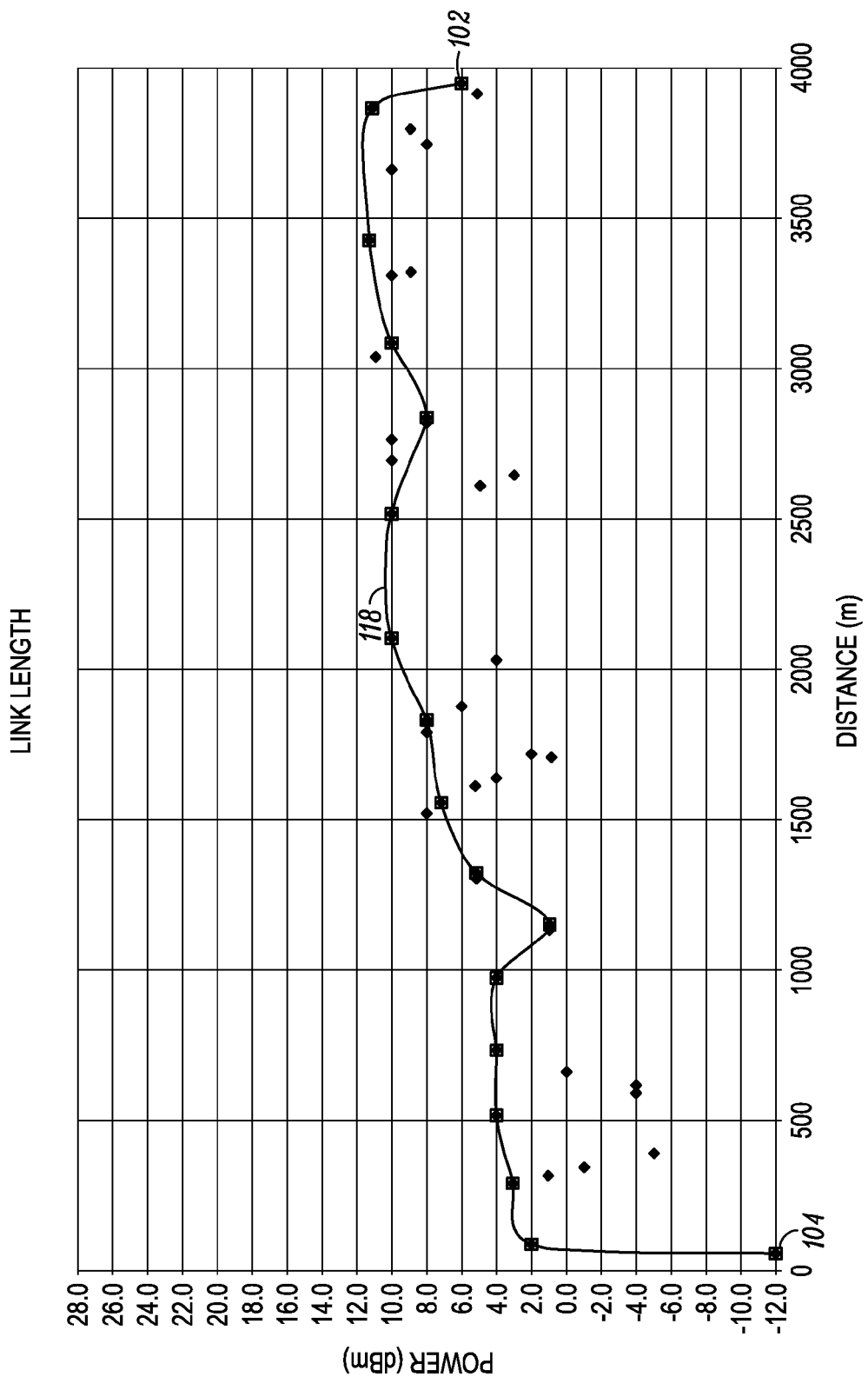
FIG. 5 is a plot illustrating an example of the smallest power route between randomly distributed nodes employing a system and method according to an embodiment of the present invention.
Figure 6:
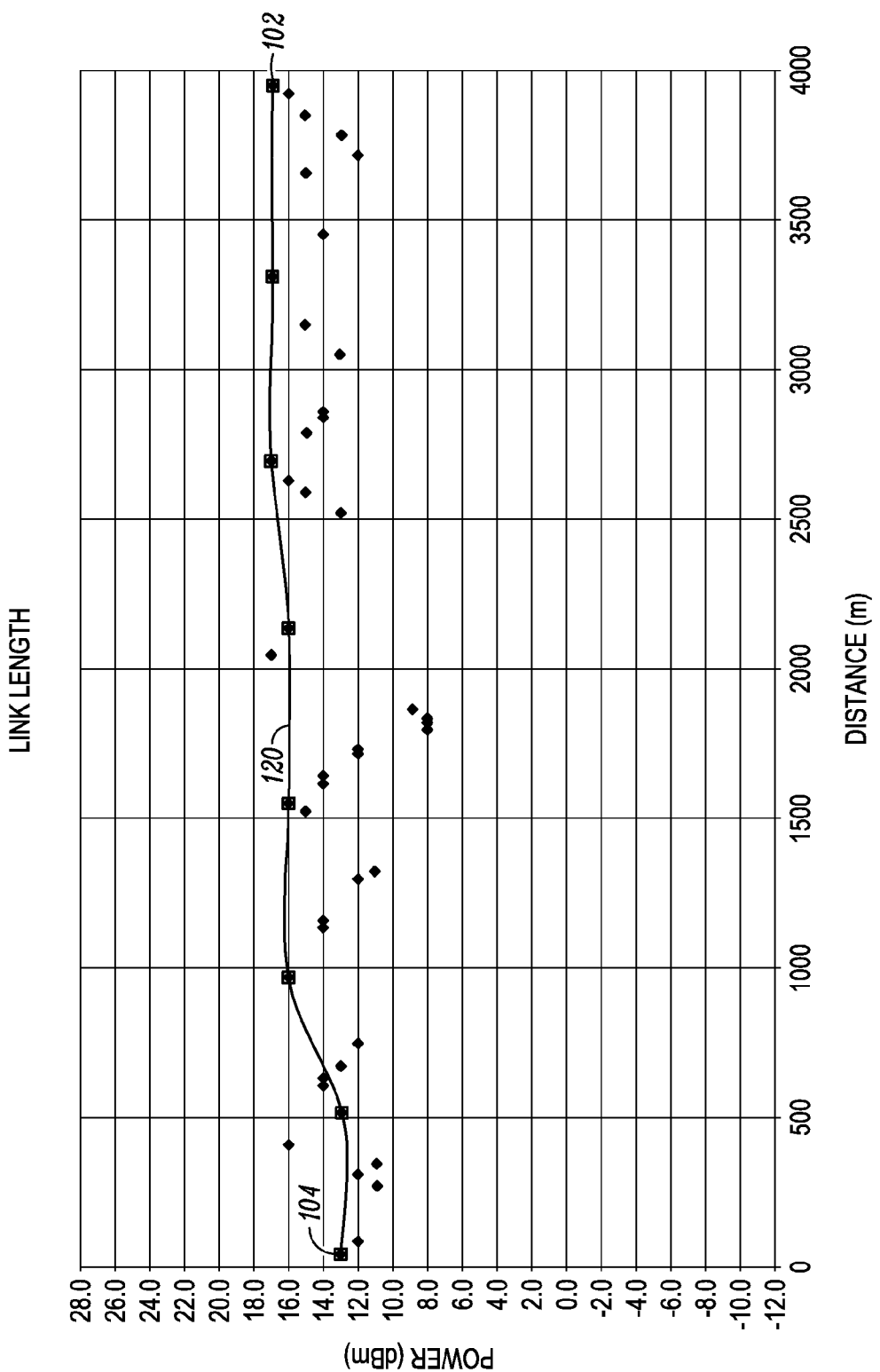
FIG. 6 is a plot illustrating an example of an optimum route between randomly distributed nodes in a fully connected network employing a system and method according to an embodiment of the present invention.

FIGS. 5 and 6 present an example of the simulated power profile of a group of 50 fully connected mobile nodes in an ad-hoc network, such as those described in FIGS. 1–4. A transmission path power loss from source to destination may be computed with the following equation (2):

$$L = 32.45 + 20\lambda \log_{10}(d*f) \text{ dBm} \quad (2)$$

As can be appreciated by one skilled in the art, path power loss increases as the distance between receiver and transmitter increases, as well as transmission delays. For the example of the embodiment shown in FIGS. 5 and 6, the value of $\lambda$ is 1.5, and receiver sensitivity is given at $-108.7$ dB and antenna gain is given at $+2$ dB. The value d is the distance between receiver and transmitter in kilometers, and f is the transmitter frequency in MHz. These variables are presented as examples, and may be adjusted for other applications.

FIG. 5 shows an example of the power profile for a group of 50 mobile nodes located at random along a linear network, such as a node distribution along a 4 kilometer road. On the horizontal axis of the chart of FIG. 5, the connection distance between nodes in meters is presented, while on the vertical axis the transmitting power of each mobile node is presented. Each mobile node is represented as a diamond throughout the plot and at the far left, the IAP providing the connection to systems beyond the ad-hoc network is shown.

The chart in FIG. 5 shows the connectivity, or first path 118, between node 104 and 102 using minimum transmission energy levels (i.e. typically a route including the maximum number of hops). As positioned in FIG. 5, the IAP 104 can hear the first adjacent node that is close, but cannot hear nodes beyond this first node. For reaching the first adjacent node, the IAP 104 needs only very low transmission power levels.

In the present example, the mobile node 102 on the far right of the plot in FIG. 5 is the client (or source node), requesting a connection to some correspondent node outside this network neighborhood, with a service class requirement of no more than seven (7) hops to be used for this connection. The network neighborhood of FIG. 5 is fully connected meaning each node may communicate with neighbor nodes while using as little power as possible. Being fully connected, the power correction computed with equation (1) is applied at both the IAP 104 and mobile node 102. Had this been a loosely connected neighborhood, the power correction would be applied to either the IAP, if data travels from the IAP to the mobile node, or applied to the mobile node 102, if data travels from the mobile node to the IAP.

In FIG. 5, the connection route between node 104 and 102 is shown as path 118, where the vertical axis describes the transmission power level at a node, and the horizontal axis describes the distance between nodes of the network. In FIG. 5, the connectivity path or lowest power route connecting the IAP 104 with the client mobile node 102 is shown and includes seventeen (17) hops between nodes in a fully connected network. The route is shown as a sequence of nodes, where the nodes actually comprising the transmission route are displayed as "◊" symbols, connected by a solid line 118. Along the route 118, the transmit power profile varies from $-12$ dBm to $+11$ dBm as shown on the vertical axis of FIG. 5. However, for certain service classes, such a large number of hops may be excessive and therefore, may require reductions through the modification of the transmission route in accordance with an embodiment of the present invention.

In FIG. 6, a transmission power profile for an optimum path 120 in the network neighborhood of FIG. 5 is shown, where the class of provided service requires a route containing no more than seven (7) hops, rather than the seventeen (17) present in the connectivity path 118 shown in FIG. 5. For a route containing seven (7) hops, the route will be comprised of eight nodes from the fifty nodes of FIG. 5. The route is shown as a sequence of nodes, where the nodes actually comprising the transmission route are displayed as "◊" symbols, connected by a solid line 120. Along the route 120, the transmit power profile varies from $+13$ dBm to $+17$ dBm.

In the embodiment shown in FIGS. 5 and 6, equation (1) is applied to determine a new transmission power level to be applied to the IAP 104 and mobile node 102 of FIG. 5, to provide the correct number of hops allowed by the service class, and produce the route shown in FIG. 6. In equation (1), $$P = P_0 + \left\lceil 20\lambda \log_{10}\left(\frac{N_0}{N}\right) \right\rceil \text{ dBm} \quad (1)$$

From the initial path shown in FIG. 5, where maximum hops $N_0$ are permitted to yield the lowest transmission power level $P_0$, $N_0$ is seventeen (17). In the example presented herein, a new transmission route is required between nodes 104 and 102 having a maximum number of seven (7) hops between nodes, as directed by service class or any variety of parameters. Therefore, in the example presented, the number of hops desired N is seven (7) and $\lambda$ is 1.5 in equation (1). Equation (1) can be solved for $P - P_0$, which represents the power increase to be applied to both IAP 104 and mobile node 102. The power increase calculated from equation (1) for the example presented in FIGS. 5 and 6, is 11 dB.

However as pointed out earlier, adjustments to λ in equation (1) may be made if the resulting path fails to satisfy the revised route requirements.

After increasing the transmit power at IAP 104 and the client mobile node 102 by +11 dB and allowing the network neighborhood to adjust power for maintaining complete network connectivity as described above, the transmit power along the route varies from +13 dBm to +17 dBm, as shown in FIG. 6. Each node of the network moves to a higher position, according to the new power of each node after application of the new power level determined in equation (1).

Initially, the IAP 104 transmission power level was increased from −12 dB to −1 dB and the power of node 102 was increased from +6 dB to +17 dB. Once the transmission power levels of the ends of the route are increased, the fully connected network starts reacting to the change of power to maintain full network connectivity. Since IAP 104 is at a very low transmission power level when compared with neighbor nodes, the effect of the increase in transmission power at 104 has no effect on the network. The change in power at node 102 however, has a large impact on transmission power levels of the network. As explained in earlier examples, the increased transmission power level at node 102 results in node 102 reaching many more nodes than previously reached. Each node now reached, undergoes transmission power adjustments to maintain connectivity. A simulation of the result may be created, in which nodes of the network adjust transmission power levels from the right of the chart (originating with the increase at node 102) to the left of the chart of FIG. 5 (ending with the receiving node 104). The simulation may appear as if the power level changes "travel" in the network of FIG. 5, from source 102 to destination 104, the route 118 transforming into route 120 of FIG. 6 as nodes reach further and adjust transmission power levels. When the adjustment reaches node 104, the IAP changes power levels back and forth several times between 13, 9, 11 and 10 dB. When the network of FIG. 5 stabilizes into the power profile of FIG. 6, the LAP 104 has a transmission power level of +13 dB, node 102 has a transmission power level of +17 dB and each node of route 120 adjusts it's power at the level required to reach the farthest neighbor node from which transmissions are received.

The previous example of the embodiment of the present invention is shown applied to a fully connected network neighborhood. When the network neighborhood is not fully connected, or "loosely" connected, the +11 dB increase in transmitting power calculated from equation (1) is applied initially to the mobile node 102 of FIG. 5, which transmits a request for routing at +17 dBm, the maximum transmission power determined necessary for the required number of hops. In a loosely connected neighborhood, this example results in a request from node 102 that is received as far as 750 meters, and all nodes within 750 meters of node 102 receive the routing request and answer.

All nodes within 750 meters of mobile node 102 are eligible for supporting the new route, however mobile node 102 selects the mobile node located at the greatest distance as the first hop, based upon geographical distance and the path loss between nodes. While answering the request for routing initiated at node 102, the selected node at the first hop adjusts it's transmitting power to a level that assures a good reception at node 102. Since this node is at a distance of almost 750 meters from node 102, the transmitting power must be +17 dBm, the same as the transmitting power node 102 used for broadcasting the request. The selected node at the first hop then transmits a request for routing information using the same transmitting power as node 102 (+17 dBm) to allow the identification of the second hop that satisfies the pipeline delay associated to the class of service. This is repeated until reaching the destination node 104.

The rest of the loosely connected neighborhood would have node transmission power levels that are imposed by the individual participation in other active routes. If no other route is active, all nodes not involved in this route would use the proper transmit power to get to the intended neighbor. The result, is that the transmission power level in such a neighborhood changes from one message to another. Also, in such a neighborhood, each node transmits from time to time at maximum power (+28 dB in this example) a "hello" message that makes everybody aware of its neighbors and allows appropriate routing methods to be applied.

The routes in fully connected neighborhoods differ from routes in loosely connected neighborhoods, as different neighbors may be picked while building the route. In either case, the number of hops is almost the same, with a difference of ±1 hops between a path established in a fully connected network and a path established in a loosely connected network.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for establishing a communication path between a plurality of nodes in an ad-hoc multi-hopping network, comprising:
   determining a number of allowed transmission hops between nodes in a communication path for a communication traveling from a first node to a second node of said plurality and an optimum transmission power level at which at least one node is said communication path will use for transmission;
   locating said communication path between said first and second nodes by using at least one transmission at said optimum transmission power level from said first and second nodes and allowing nodes of said plurality of nodes to adjust transmission power levels at each node to maintain connectivity such that at least one of said first and second node remains at said optimum transmission power level; and
   modifying variables of said optimum transmission power level determination and repeating said communication path locating step if said number of allowed transmission hops are exceeded in said communication path.

2. A method as claimed in claim 1, further comprising determining said number of allowed transmission hops based on the transmission service class of said communication.

3. A method as claimed in claim 1, further comprising determining said optimum transmission power level based upon, $$P = P_0 + \left[20\lambda \log_{10}\left(\frac{N_0}{N}\right)\right] \text{ dBm}$$

where P is said optimum transmission power level, $P_0$ is a minimum transmission power level required to maintain network connectivity, $\lambda$ is a space absorption variable, $N_0$ is a number of transmission hops between said first and second node in a connectivity path, and N is said allowed number of transmission hops.

4. A method as claimed in claim 1, wherein said locating uses at least one transmission at said optimum transmission power level from said first node and allowing nodes of said communication path to adjust transmission power levels at each node of said path to maintain connectivity, wherein said first node remains at said optimum transmission power level.

5. A method as claimed in claim 1, wherein:
said locating uses at least one transmission at said optimum transmission power level from said first node and allowing nodes of said communication path to adjust transmission power levels at each node of said path to maintain connectivity, wherein said second node remains at said optimum transmission power level.

6. A method as claimed in claim 1, wherein:
said locating uses at least one transmission at said optimum transmission power level from said first node and allowing nodes of said communication path to adjust transmission power levels at each node of said path to maintain full connectivity between said nodes in said communication path.

7. A method as claimed in claim 1, further comprising locating said communication path by selecting nodes of said plurality of nodes using said adjusted transmission power levels to form a direct communication path between said first and second nodes having no more than said number of allowed transmission hops.

8. A method as claimed in claim 3, wherein said space absorption variable $\lambda$ may be varied according to path propagation media.

9. A wireless ad-hoc multi-hopping communications network establish a communication path between a plurality of nodes, comprising:
a source node and a destination node;
said source node determine at least one communication path between itself and said destination node based on a number of allowed transmission hops between itself and said destination node, and further determine an optimum transmission power level that at least one node in said communication path will use for transmission;
said source node further locate said communication path between itself and said destination node, and to use at least one transmission at said optimum transmission power level from itself and said destination node while at least one other node is said communication path adjusts its transmission power to maintain connectivity, such that at least one of said node and said destination node remains at said optimum transmission power level; and
wherein said source node further modify variables of said optimum transmission power level determination and repeat said communication path location if said number of allowed transmission hops are exceeded in said communication path.

10. A network as claimed in claim 9, wherein said source node further determine said number of allowed transmission hops based on the transmission service class of said communication.

11. A network as claimed in claim 9, wherein said source node further determine said optimum transmission power level based upon, $$P = P_0 + \left\lceil 20\lambda \log_{10}\left(\frac{N_0}{N}\right) \right\rceil \text{ dBm}$$

where P is said optimum transmission power level, $P_0$ is a minimum transmission power level required to maintain network connectivity, $\lambda$ is a space absorption variable, $N_0$ is a number of transmission hops between said source node and said destination node in a connectivity path, and N is said allowed number of transmission hops.

12. A network as claimed in claim 9, wherein said source node further remain at said optimum transmission power level.

13. A network as claimed in claim 9, wherein said source node further locate said communication path by selecting nodes of said plurality of nodes using said adjusted transmission power level to form a direct communication path between said source node and said destination node having no more than said number of allowed transmission hops.

14. A network as claimed in claim 11, wherein said source node further vary said space absorption factor $\lambda$ according to path propagation media.

15. A network as claimed in claim 9, wherein said source node locate said communication path by using at least one transmission at said optimum transmission power level from said first node and allowing nodes of said communication path to adjust transmission power levels at each node of said path to maintain connectivity, wherein said first node remains at said optimum transmission power level.

16. A network as claimed in claim 9,
wherein said source node locate said communication path by using at least one transmission at said optimum transmission power level from said first node and allowing nodes of said communication path to adjust transmission power levels at each node of said path to maintain connectivity, wherein said second node remains at said optimum transmission power level.

17. A network as claimed in claim 9,
wherein said source node locate said communication path by using at least one transmission at said optimum transmission power level from said first node and allowing nodes of said communication path to adjust transmission power levels at each node of said path to maintain full connectivity between said nodes in said communication path.

* * * * *